(No Model.)

R. DAINE.
CUTLERY.

No. 404,385. Patented June 4, 1889.

Witnesses.

Inventor
Richard Daine

N. PETERS, Photo-Lithographer, Washington, D. C.

UNITED STATES PATENT OFFICE.

RICHARD DAINE, OF HALIFAX, NOVA SCOTIA, CANADA.

CUTLERY.

SPECIFICATION forming part of Letters Patent No. 404,385, dated June 4, 1889.

Application filed July 19, 1888. Serial No. 280,452. (No model.) Patented in Canada July 19, 1888, No. 29,508.

*To all whom it may concern:*

Be it known that I, RICHARD DAINE, cutler, a citizen of the British Empire, residing at Halifax, in the county of Halifax, Province of Nova Scotia, and Dominion of Canada, have invented a certain new and useful Knife, to be known and designated as "Daine's Patent Combination-Knife," (for which I have obtained Letters Patent in Canada, July 19, 1888, No. 29,508,) of which the following is a specification.

My invention relates to improvements in cutlery—namely, a combination of knife-blades in one handle, with a view of economy and convenience. The combination consists of two different blades, such as an eraser-blade and a paper-knife blade, or a fruit-knife blade and a dessert-knife blade, in the one handle. These blades are not separate, but are made from the one piece of metal, one blade at each end. They are fastened into the handle by a rivet at the junction of the two blades, so as to permit of their being reversed in the handle. The handle is fitted with a movable or adjustable back fitted to open at one end to allow of the blades being reversed in the handle and then closed tight, so as to keep them in position. This back has a small nick or notch at one end to allow of the finger-nail being inserted to open it.

Figure 1:
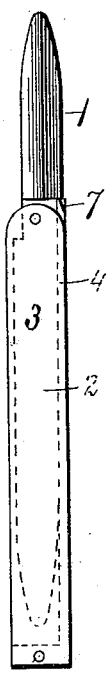
Figure 2:
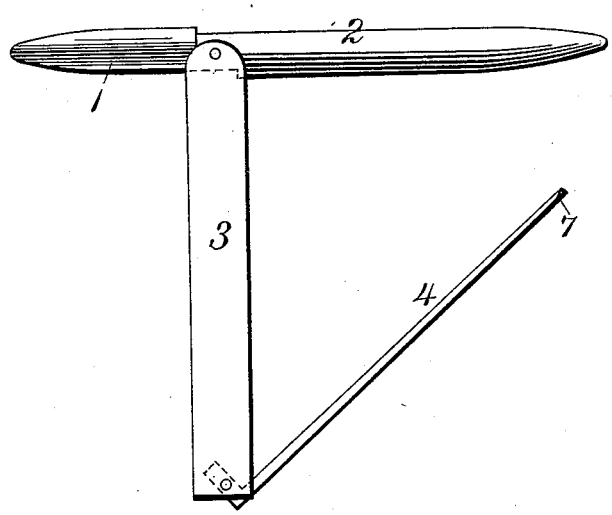

Figure 1 on the drawings herewith shows the knife with the blades in position ready for use. Fig. 2 shows how the blades pass through the handle when the back-support is open.

1 is the eraser-blade, 2 is the paper-knife blade, 3 is the handle, 4 is the back, and 7 is notch at end of back.

I make no claim in respect of the two blades in the one piece of metal, as I understand that such a combination is not novel and is covered by existing patents; but

I claim—

In a knife, the movable or adjustable back fitted so as to admit of its being opened to allow either end of the double-ended blade aforesaid to pass out of the handle and being then closed to retain the blade in position.

Halifax, N. S., May 23, 1888.

RICHARD DAINE.

In presence of—
   F. H. BELL,
   J. M. CHISHOLM.